United States Patent
Inoue et al.

(10) Patent No.: US 10,651,477 B2
(45) Date of Patent: May 12, 2020

(54) POROUS CARBON ELECTRODE SUBSTRATE, METHOD OF MANUFACTURING SAME, GAS DIFFUSION LAYER, AND MEMBRANE-ELECTRODE ASSEMBLY FOR FUEL CELL

(71) Applicant: Toray Industries, Inc., Tokyo (JP)

(72) Inventors: Mikio Inoue, Otsu (JP); Takayuki Oda, Otsu (JP); Tamotsu Suzuki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 101 days.

(21) Appl. No.: 15/558,456

(22) PCT Filed: Mar. 22, 2016

(86) PCT No.: PCT/JP2016/058976
§ 371 (c)(1),
(2) Date: Sep. 14, 2017

(87) PCT Pub. No.: WO2016/152851
PCT Pub. Date: Sep. 29, 2016

(65) Prior Publication Data
US 2018/0069245 A1    Mar. 8, 2018

(30) Foreign Application Priority Data

Mar. 25, 2015  (JP) ................................. 2015-062063

(51) Int. Cl.
| | | |
|---|---|---|
| *H01M 4/88* | (2006.01) | |
| *H01M 8/1004* | (2016.01) | |
| *H01M 8/02* | (2016.01) | |
| *C01B 32/05* | (2017.01) | |
| *H01M 8/0243* | (2016.01) | |
| *H01M 8/0234* | (2016.01) | |
| *H01M 4/92* | (2006.01) | |
| *H01M 8/1018* | (2016.01) | |

(52) U.S. Cl.
CPC ........... *H01M 4/8807* (2013.01); *C01B 32/05* (2017.08); *H01M 4/8817* (2013.01); *H01M 8/0234* (2013.01); *H01M 8/0243* (2013.01); *H01M 8/1004* (2013.01); *H01M 4/926* (2013.01); *H01M 2008/1095* (2013.01); *Y02P 70/56* (2015.11)

(58) Field of Classification Search
CPC ........ H01M 4/88; H01M 4/92; H01M 8/1004; C01B 32/05
See application file for complete search history.

(56) References Cited

U.S. PATENT DOCUMENTS

| | | | |
|---|---|---|---|
| 2012/0115063 A1* | 5/2012 | Sumioka ................ | D21H 13/50 429/480 |
| 2013/0059226 A1 | 3/2013 | Gomi et al. | |
| 2013/0323620 A1* | 12/2013 | Tatsuno ................ | D21H 13/50 429/482 |
| 2017/0244108 A1 | 8/2017 | Sode et al. | |

FOREIGN PATENT DOCUMENTS

| | | |
|---|---|---|
| CN | 101002354 A | 7/2007 |
| EP | 2669977 A1 | 12/2013 |
| EP | 2680352 A2 | 1/2014 |
| EP | 3396753 A1 | 10/2018 |
| JP | 2010-70433 A | 4/2010 |
| JP | 2012-33458 A | 2/2012 |
| JP | 2012-204142 A | 10/2012 |
| JP | 2013-65413 A | 4/2013 |
| JP | 2013-145640 A | 7/2013 |
| JP | 2015-41456 A | 3/2015 |
| WO | 2016/060044 A1 | 4/2016 |
| WO | 2017/110691 A1 | 11/2018 |

OTHER PUBLICATIONS

Machine Translation of: JP 2013/145640 A, Tsubosaka et al., Jul. 25, 2013.*
Extended European Search Report dated Oct. 19, 2018, of counterpart European Application No. 16768754.0.
The First Office Action dated Jan. 20, 2020, of counterpart Chinese Application No. 201680015135.2, along with an English translation.

* cited by examiner

*Primary Examiner* — Kenneth J Douyette
(74) *Attorney, Agent, or Firm* — DLA Piper LLP (US)

(57) ABSTRACT

A porous carbon electrode substrate hardly causes a short circuit when used in a fuel cell, and from which carbon fibers protruding from the substrate surface, carbon fibers that protrude from the substrate surface when the porous carbon electrode substrate is pressurized in a direction perpendicular to a surface thereof, and short carbon fibers that are insufficiently bonded at the substrate surface have been sufficiently removed. The porous carbon electrode substrate includes short carbon fibers and carbonized resin bonding the short carbon fibers, the porous carbon electrode substrate having an average short circuit current value measured at a first surface of 10 mA or less.

10 Claims, No Drawings

POROUS CARBON ELECTRODE SUBSTRATE, METHOD OF MANUFACTURING SAME, GAS DIFFUSION LAYER, AND MEMBRANE-ELECTRODE ASSEMBLY FOR FUEL CELL

TECHNICAL FIELD

This disclosure relates to a porous carbon electrode substrate suitably used in a gas diffusion layer and a membrane-electrode assembly for a fuel cell, and a method of manufacturing the porous carbon electrode substrate.

BACKGROUND

A fuel cell, for example, a polymer electrolyte fuel cell converts chemical energy of a substance directly into electric energy through an electrochemical reaction caused by supply of reaction gases (a fuel gas and an oxidant gas) through gas diffusion layers to a membrane-electrode assembly that includes a polymer electrolyte membrane sandwiched between a pair of catalyst layers.

A gas diffusion layer of a fuel cell is produced by subjecting a porous carbon electrode substrate such as carbon paper to a water repellent treatment, and has a microporous layer on a surface in contact with a catalyst layer. When monofilaments of carbon fibers of the porous carbon electrode substrate penetrate the polymer electrolyte membrane, the performance of the fuel cell may deteriorate due to a short circuit or degradation of the polymer electrolyte membrane starting from the penetrated portion. Even though the performance deterioration initially has a small influence on the power generation, repeated swelling and shrinkage of the membrane due to repetition of starting and stopping of the fuel cell advance the short circuit and degradation of the polymer electrolyte membrane to lower the durability of the fuel cell.

Therefore, Japanese Patent Laid-open Publication No. 2010-70433 discloses a method of manufacturing a porous carbon electrode substrate from which short carbon fibers not bonded with carbonized resin have been sufficiently removed through a treatment of blowing gas onto at least one surface of the porous carbon electrode substrate.

In addition, Japanese Patent Laid-open Publication No. 2012-33458 discloses a method including disposing an insulating member having a plurality of communicating holes on a water-repellent layer side of a gas diffusion layer formed by laminating a layer made of carbon fibers and a water-repellent layer, sandwiching the gas diffusion layer and the insulating member between a pair of electrodes, disposing a pair of pressure plates on back surfaces of the pair of electrodes to sandwich the electrodes, and pressurizing the gas diffusion layer with the pair of surface pressure plates. When a voltage is applied to the pair of electrodes while the gas diffusion layer is pressurized, a current is caused to flow through the protruding portion of the carbon fibers contacting the electrode on the water-repellent layer side through the communicating holes in the insulating member, and the protruding carbon fibers are burned off with Joule heat.

Meanwhile, Japanese Patent Laid-open Publication No. 2012-204142 discloses a method including disposing an elastic sheet on at least one surface of a carbon sheet including short carbon fibers bonded with carbon, pressurizing the carbon sheet at a linear pressure of 5 kN/m to 30 kN/m using a continuous pressurizing means, and then continuously removing the carbon powder adhered to the carbon sheet by a method of sweeping the carbon powder with a brush or the like, a method of sucking the carbon powder, ultrasonic cleaning or the like.

The method described in Japanese Patent Laid-open Publication No. 2010-70433, however, has the following problem: although the surface of the gas diffusion layer can be cleaned to some extent, carbon fibers newly protrude when the gas diffusion layer is compressed, for example, in a step of joining the gas diffusion layer to a polymer electrolyte membrane and, thus, the protruding carbon fibers stick into the polymer electrolyte membrane to generate a large short circuit current.

The method described in Japanese Patent Laid-open Publication No. 2012-33458 has the following problem: the carbon fibers tend to burn off in a narrow portion of protruding carbon fibers that generates a large heat, and in the middle part in the longitudinal direction of protruding carbon fibers with little heat radiation so that the carbon fibers protruding from the gas diffusion layer to the cut portion may remain, or portions of the carbon fibers protruding beyond the cut portion may be contaminated and cause a short circuit of the polymer electrolyte membrane.

The method described in Japanese Patent Laid-open Publication No. 2012-204142 also has a problem that, since an elastic sheet is disposed on at least one surface of the carbon sheet, the pressurizing force is distributed to fold the short carbon fibers, and the effect of removing the short carbon fibers is reduced.

It could therefore be helpful to provide a porous carbon electrode substrate that hardly causes a short circuit when used in a fuel cell, and from which short carbon fibers insufficiently bonded at the substrate surface have been sufficiently removed.

SUMMARY

We thus provide:

(1) A porous carbon electrode substrate including short carbon fibers and carbonized resin bonding the short carbon fibers, the porous carbon electrode substrate having an average short circuit current value measured at a first surface (referred to as surface A) of 10 mA or less.

(2) A porous carbon electrode substrate including short carbon fibers and carbonized resin bonding the short carbon fibers, the porous carbon electrode substrate having a short circuit current of 10 mA or less at 90% or more of measurement points when the short circuit current is measured at a first surface (referred to as surface A).

(3) A method of manufacturing the porous carbon electrode substrate according to (1) or (2), the method including heating a composition containing short carbon fibers and a resin having a residual carbon rate of 35% (mass basis) or more (hereinafter referred to as resin A) to carbonize resin A, wherein, as for a mass ratio of the short carbon fibers to resin A in the composition, the composition contains 70 to 250 parts by mass of resin A based on 100 parts by mass of the short carbon fibers.

(4) A gas diffusion layer including the porous carbon electrode substrate according to (1) or (2), and a microporous layer on one surface of the porous carbon electrode substrate.

(5) A membrane-electrode assembly for a fuel cell, including the porous carbon electrode substrate according to (1) or (2).

It is possible to obtain a porous carbon electrode substrate that hardly causes a short circuit when used in a fuel cell, and from which carbon fibers protruding from the substrate surface, carbon fibers that protrude from the substrate surface when the porous carbon electrode substrate is pressurized in a direction perpendicular to a surface thereof, and short carbon fibers and carbonized resin insufficiently bonded at the substrate surface have been sufficiently removed.

DETAILED DESCRIPTION

The porous carbon electrode substrate is a porous carbon electrode substrate including short carbon fibers and carbonized resin bonding the short carbon fibers.

A porous carbon electrode substrate having an average short circuit current value measured at a first surface (referred to as surface A) of 10 mA or less is referred to as substrate 1, and a porous carbon electrode substrate having a short circuit current of 10 mA or less at 90% or more of measurement points when the short circuit current is measured at surface A is referred to as substrate 2.

Examples of the carbon fibers that form the short carbon fibers include polyacrylonitrile (PAN)-based, pitch-based, and rayon-based carbon fibers. Among them, it is preferred to use PAN-based and pitch-based carbon fibers, particularly PAN-based carbon fibers since an electrode substrate having excellent mechanical strength and moderate flexibility can be obtained.

It is preferred to select such carbon fibers having an average diameter (average diameter of monofilaments) of 4 to 20 μm. Selecting carbon fibers having an average diameter of 4 to 20 μm makes it possible to improve the flexibility and mechanical properties of the porous carbon electrode substrate. Since short carbon fibers are obtained from such carbon fibers, it is preferred that the short carbon fibers also have an average diameter of 4 to 20 μm.

The average diameter of monofilaments of carbon fibers is measured by taking a cross sectional photograph of monofilaments of carbon fibers and measuring the average diameter in the photographed image. When the cross section is not circular, the average value of the major axis and the minor axis is taken as the diameter. The average value of diameters of five monofilaments is taken as the average diameter. This also applies to when the carbon fibers are short carbon fibers.

The short carbon fibers mean carbon fibers having an average fiber length of 3 to 20 mm. That is, short carbon fibers can be obtained by cutting the above-mentioned carbon fibers. In such a case, it is important to cut the carbon fibers so that the average fiber length is 3 to 20 mm. When carbon fibers having an average fiber length less than 3 mm are used, the mechanical properties of the obtained porous carbon electrode substrate such as the maximum bending load and elastic modulus, may deteriorate. In contrast, when carbon fibers having an average fiber length exceeding 20 mm are used, dispersibility at the time of papermaking described later deteriorates, and the variation in areal weight of the carbon fibers in the obtained porous carbon electrode substrate increases so that the quality may deteriorate.

A short carbon fiber sheet in which short carbon fibers are dispersed can be obtained by either a dry papermaking method or a wet papermaking method. A wet papermaking method in which water is used as a papermaking medium is preferred since the short carbon fibers are more likely to be oriented parallel to the sheet surface. That is, the wet papermaking method is preferred for the following reasons: short carbon fibers hardly orient in the direction perpendicular to the sheet, and thus a short circuit penetrating the membrane of the fuel cell hardly occurs and the short circuit current can be suppressed to a low level and, moreover, a homogeneous sheet having good short carbon fiber dispersibility can be obtained, and thus the short circuit current can be suppressed to a low level at a large number of measurement points. To control the pore structure of the porous carbon electrode substrate, the short carbon fiber sheet may contain a flame-resistant fiber, an organic fiber, or pulp in an amount not more than the mass of the short carbon fibers. To prevent short carbon fibers from falling off the porous carbon electrode substrate, the total content of the flame-resistant fiber, organic fiber, and pulp is preferably 0 parts by mass or more and 50 parts by mass or less based on 100 parts by mass of the short carbon fibers in the porous carbon electrode substrate. To improve shape retainability and handleability, the short carbon fiber sheet preferably contains an organic binder such as polyvinyl alcohol, cellulose, polyester, an epoxy resin, a phenolic resin, or an acrylic resin. In such a case, it is preferred that the total amount of these organic binders be 1 to 30 mass %.

In the production of the short carbon fiber sheet, it is preferred that the areal weight of the short carbon fibers in the short carbon fiber sheet be 10 to 50 $g/m^2$. Controlling the areal weight of the short carbon fibers in the short carbon fiber sheet to 10 to 50 $g/m^2$ improves the mechanical strength of the obtained porous carbon electrode substrate and also maintains sufficient flexibility of the substrate. Furthermore, controlling the areal weight of the short carbon fibers in the short carbon fiber sheet to 10 to 50 $g/m^2$ can suppress orientation of the short carbon fibers in the direction perpendicular to the sheet, and thereby suppress a short circuit penetrating the membrane of the fuel cell. As a result, the short circuit current can be kept at a low level, and the short circuit current at a large number of measurement points can also be suppressed to a low level. The areal weight of the short carbon fibers in the short carbon fiber sheet is more preferably 15 to 35 $g/m^2$.

A porous carbon electrode substrate can be obtained by impregnating the resulting short carbon fiber sheet with a resin having a residual carbon rate of 35% (mass basis) or more (hereinafter referred to as resin A) to prepare a composition containing the short carbon fibers and resin A, and heating the composition to carbonize resin A.

Resin A is carbonized by heating in an inert atmosphere and turns into carbonized resin that bonds the short carbon fibers together. Examples of resin A having a residual carbon rate of 35% (mass basis) or more include a phenolic resin, an epoxy resin, a furan resin, and a melamine resin.

The residual carbon rate is calculated using the mass before carbonization, WA (g) and the mass after carbonization, WC (g) when the resin is carbonized by heating to 800° C. in a nitrogen atmosphere at a heating rate of 0.5 to 5° C./min according to the formula:residual carbon rate (%)= (WC/WA)×100. When a thermosetting resin is used as resin A, before heating to 800° C., the resin is heated and cured under conditions suitable for the resin. In the manufacturing conditions of the porous carbon electrode substrate, heating may be carried out at a temperature exceeding 2000° C. in some cases. However, the residual carbon rate is defined by the method of heating to 800° C. since the mass reduction of the resin occurs mainly during heating to 800° C. Furthermore, at the measurement of the residual carbon rate, a porous carbon plate carbonized by heating at a temperature of 2000° C. or more is impregnated with resin A, then, when the porous carbon plate contains a solvent, the solvent is removed by drying, resin A is cured as necessary, and then resin A is carbonized under the above-mentioned conditions. A porous carbon plate carbonized at a temperature of 2000° C. or more is a material substantially consisting only of carbon and, for example, a porous carbon electrode substrate including short carbon fibers and carbonized resin bonding the short carbon fibers can be used. Since the porous carbon plate carbonized at a temperature of 2000° C. or more does not decrease in mass in a nitrogen atmosphere up to 800° C., it is possible to determine the mass of resin A before and after carbonization by subtracting the mass of the porous carbon plate before being impregnated with resin A from the mass of the porous carbon plate impregnated with resin A before and after carbonization, respectively.

When using a short carbon fiber sheet containing resin A (the sheet is referred to as a composite sheet) as a composition containing short carbon fibers and resin A, it is also preferred to mold the composite sheet by heating and pressurization before carbonizing the sheet by heating. This molding can control the thickness and porosity of the porous carbon electrode substrate to more appropriate values. The molding temperature is preferably 100 to 250° C., and the molding pressure to be applied is preferably 0.01 to 5 MPa.

Average Short Circuit Current Value

In the porous carbon electrode substrate 1, it is important that the porous carbon electrode substrate have an average short circuit current value measured at a first surface (referred to as surface A) of 10 mA or less. In the porous carbon electrode substrate 2, it is preferred that the porous carbon electrode substrate have an average short circuit current value measured at surface A of 10 mA or less.

The short circuit current means a value specified by the following procedure (1) to (3).

(1) A polymer electrolyte membrane "NAFION" (registered trademark) NR211 (manufactured by DuPont) having a thickness of 25 μm is stacked on a first surface (referred to as surface A) of the porous carbon electrode substrate. The porous carbon electrode substrate has a square shape of 4 cm on one side, and the polymer electrolyte membrane has a square shape of 5.5 cm or more on one side. The polymer electrolyte membrane and the porous carbon electrode substrate are stacked so that each side of the polymer electrolyte membrane is parallel to each side of the porous carbon electrode substrate, and the center of the polymer electrolyte membrane coincides with the center of the porous carbon electrode substrate.

(2) The stacked polymer electrolyte membrane and the porous carbon electrode substrate are sandwiched between two gold-plated stainless steel block electrodes (the sandwiching surface is a 5-cm square), and the area of 16 cm$^2$ of the porous carbon electrode substrate is pressurized at a pressure of 1.0 MPa. In this case, to prevent direct contact between the two gold-plated stainless steel block electrodes, the polymer electrolyte membrane and the porous carbon electrode substrate are sandwiched so that each side of the sandwiching surface of the stainless steel block electrodes and each side of the porous carbon electrode substrate are parallel to each other, and the center of the stainless steel block electrodes and the center of the porous carbon electrode substrate coincide with each other.

(3) A DC voltage of 1.0 V is applied between the gold-plated stainless steel block electrodes using a digital multimeter (KEITHLEY Model 196 SYSTEM DMM), and the current between the electrodes is measured as the short circuit current.

The average short circuit current value is obtained by repeating the procedure of (1) to (3) 20 times with different measurement samples of the porous carbon electrode substrate, and averaging the obtained 20 short circuit current values.

This short circuit current measurement method is a test method simulating a short circuit of the polymer electrolyte membrane at the first surface of the porous carbon electrode substrate in a fuel cell. The test conditions are exaggerated as compared to the conditions in an actual fuel cell since an actual fuel cell includes a microporous layer and a catalyst layer between the porous carbon electrode substrate and the polymer electrolyte membrane. The reason why the sides are made parallel and the centers are made to coincide with each other in items (1) and (2) is to pressurize the entire surface of the porous carbon electrode substrate and prevent the contact between the two stainless steel blocks, by superposing the entire surface of the 4-cm square porous carbon electrode substrate on the polymer electrolyte membrane and sandwiching the entire surface of the porous carbon electrode substrate between the stainless steel block electrodes, and covering the entire surface of the sandwiching surfaces of the 5-cm square stainless steel block electrodes with the polymer electrolyte membrane.

When the average short circuit current value measured at a first surface (referred to as surface A) of the porous carbon electrode substrate exceeds 10 mA, protrusions such as short carbon fibers protruding from the porous carbon electrode substrate may cause a short circuit in the polymer electrolyte membrane, and this may cause a deterioration in power generation performance under long-term operation of the fuel cell. Therefore, it is important that the porous carbon electrode substrate 1 have an average short circuit current value measured at surface A of 10 mA or less. In addition, it is preferred that the porous carbon electrode substrate 2 have an average short circuit current value measured at surface A of 10 mA or less. Furthermore, the average short circuit current value measured at surface A of the porous carbon electrode substrate is preferably 0 mA or more and 5 mA or less, more preferably 0 mA or more and 1 mA or less, from the viewpoint of suppressing deterioration in power generation performance.

Percentage of Measurement Points at which Short Circuit Current is 10 mA or Less In the porous carbon electrode substrate 2, it is important that the porous carbon electrode substrate have a short circuit current of 10 mA or less at 90% or more of measurement points when the short circuit current is measured at a first surface (referred to as surface A). In addition, it is preferred that the porous carbon electrode substrate 1 have a short circuit current of 10 mA or less at 90% or more of measurement points when the short circuit current is measured at surface A.

Herein, "a short circuit current of 10 mA or less at 90% or more of measurement points" means that when the procedure of (1) to (3) in the measurement of short circuit current is repeated 20 times with different measurement samples and averaging the obtained 20 short circuit current values, 90% or more of the obtained 20 short circuit current values (that is, 18 or more short circuit current values) are 10 mA or less.

The porous carbon electrode substrate 2 can suppress deterioration in power generation performance since it has a short circuit current as measured at surface A of 10 mA or less at 90% or more of measurement points. In addition, the porous carbon electrode substrate 1 can favorably further suppress deterioration in power generation performance since it has a short circuit current as measured at surface A of 10 mA or less at 90% or more of measurement points. It is further preferred that the porous carbon electrode substrate have a short circuit current as measured at surface A of 10 mA or less at 95% or more and 100% or less of measurement points.

It is possible to suppress the short circuit current to a low level and further suppress the short circuit current at a large number of measurement points to a low level by increasing the percentage of the carbonized resin that bonds short carbon fibers in the porous carbon electrode substrate and increasing the density of the porous carbon electrode substrate. However, any means that lowers the gas permeability of the porous carbon electrode substrate is not preferred.

A preferred method of suppressing the short circuit current to a low level and further suppressing the short circuit current at a large number of measurement points to a low level is to increase the heating rate at the time of heating the composition containing the short carbon fibers and resin A to carbonize resin A in the method of manufacturing the porous carbon electrode substrate. When the heating rate is increased, the amount of thickness shrinkage during carbonization by heating of the porous carbon electrode substrate is reduced, and the bond between the carbonized resin A and the short carbon fibers becomes difficult to loosen. In addition, when the heating rate is increased, since the amount of thickness shrinkage during carbonization by heating is small, it is necessary to reduce the thickness of the porous carbon electrode substrate beforehand by application of a high pressure in the molding step as a preliminary step. Also, in view of this point, the bond between the carbonized resin A and the short carbon fibers is strengthened and becomes difficult to loosen. As to the heating rate during carbonization by heating, an average heating rate from the furnace entrance (room temperature) to the maximum temperature in the furnace is preferably 2000 to 15000° C./min. When performing two-step heating in a low-temperature furnace and a high-temperature furnace, at least one of the furnaces, preferably both the furnaces have an average heating rate in the above-mentioned range because it is effective in suppressing the protrusion of short carbon fibers from the surface of the porous carbon electrode substrate.

Moreover, it is difficult to suppress the average short circuit current value to 10 mA or less and further suppress the short circuit current to 10 mA or less at 90% or more of measurement points only by using any of the methods described above singly, and it is preferred to use any of the methods described above in combination with a method of removing short carbon fibers protruding from the surface of the porous carbon electrode substrate. In particular, it is preferred to employ a method of calendering the porous carbon electrode substrate, carrying out air blowing or suction, then causing a current to flow through the protruding portion of short carbon fibers to burn off the protruding short carbon fibers with Joule heat, followed by air blowing or suction. A method of burning off protruding short carbon fibers by causing a current to flow is called electric current burning.

In the calendering, the porous carbon electrode substrate may be calendered with paper or a film lower in surface roughness than the porous carbon electrode substrate overlaid on one surface or both surfaces of the porous carbon electrode substrate, but the compressive elasticity modulus of the paper or film does not have to be limited. When the porous carbon electrode substrate is calendered with paper or a film overlaid on both surfaces thereof and then the paper or film is collected separately, adhesion to the roll of short carbon fibers, carbonized resin, and carbon powder fell off the porous carbon electrode substrate can be prevented. Further, the falling of these from the roll and readhesion of these to the porous carbon electrode substrate can be prevented. A method of providing the roll with a cleaning mechanism to remove the short carbon fibers and carbonized resin adhered to the roll and directly pressurizing the porous carbon electrode substrate with the roll is also preferred, since this method prevents distribution of pressurizing force of the roll and removes the short carbon fibers and carbonized resin protruding from the porous carbon electrode substrate, and further eliminates the necessity of paper or a film.

The linear pressure in calendering is preferably 80 to 150 N/cm. If the pressure is too low, the effect of breaking and removing the short carbon fibers is small, whereas if the pressure is too high, the porous carbon electrode substrate will be broken, which may cause falling off and fuzzing of the short carbon fibers. When the broken or almost broken short carbon fibers are removed by air blowing or suction after the calendering, the protruding short carbon fibers can then be efficiently burned off with Joule heat of the subsequently applied current. When the porous carbon electrode substrate is calendered before the short carbon fibers are burned off, short carbon fibers protruding from the surface of the porous carbon electrode substrate are damaged in the vicinity of the root near the part where the fibers are bonded with the carbonized resin rather than in the flexible fiber part, and the short carbon fibers are easily broken by electric current burning since the damaged portion in the vicinity of the root has increased electric resistance value. As a result, it is possible to prevent the burned residue of the short carbon fibers near the root, which is a problem in the application of a current without calendering. Furthermore, it is possible to prevent excessive current application due to thickness variation of the porous carbon electrode substrate by making the thickness uniform through the calendering. Excessive current application is a phenomenon that the current density decreases when a current is applied to a large number of sites in a thick portion of the porous carbon electrode substrate, and the short carbon fibers cannot be burned off even when a current flows. This phenomenon can be prevented by calendering. After removal of protruding carbon fibers by electric current burning, air blowing or suction is performed again, and the fallen short carbon fibers and weakened portions of the protruding short carbon fibers are removed to further reduce the short circuit current. As a result, it is possible to adjust the average short circuit current value at surface A to 10 mA or less and also to adjust the short circuit current to 10 mA or less at 90% or more of measurement points in surface A.

The porous carbon electrode substrate is preferably manufactured by a method including heating a composition containing short carbon fibers and resin A to carbonize resin A, wherein, as for a mass ratio of the short carbon fibers to resin A in the composition, the composition contains 70 to 250 parts by mass of resin A based on 100 parts by mass of the short carbon fibers. A porous carbon electrode substrate obtained by such a method can have a low level of short circuit current because the bond between the carbonized resin A and the short carbon fibers is strong, and the short carbon fibers are less likely to fall off the porous carbon electrode substrate. Furthermore, such a porous carbon electrode substrate can be suppressed in an excessive increase in the bulk density, and can exhibit excellent gas permeability and power generation performance. A more preferred mass ratio of the short carbon fibers to resin A in the composition is 100 to 150 parts by mass of resin A based on 100 parts by mass of the short carbon fibers.

It is also preferred to incorporate a carbon powder such as a graphite powder, carbon black, carbon nanotubes, or graphene into resin A. When the carbon powder is incorporated into resin A, the obtained porous carbon electrode substrate contains the carbon powder. Accordingly, shrinkage and occurrence of cracks during carbonization of resin A are suppressed, and falling of the short carbon fibers and the short circuit of the polymer electrolyte membrane due to a decrease in bond between the carbonized resin A and the short carbon fibers can be prevented and, as a result, the short circuit current can be suppressed to a low level. To achieve such an effect, it is preferred that the carbon powder have an average particle diameter (average particle diameter D50 measured by a laser diffraction method) of 1 to 10 μm.

The porous carbon electrode substrate is preferably obtained by a manufacturing method including heating a composition containing short carbon fibers, resin A, and a carbon powder to carbonize resin A, wherein, as for the content of the carbon powder in the composition, the composition contains 5 to 70 parts by mass of the carbon powder based on 100 parts by mass of resin A. A porous carbon electrode substrate obtained by such a method can be suppressed in the shrinkage and occurrence of cracks during carbonization of resin A, and can contain an adequate amount of the carbonized resin A at the bonding of the short carbon fibers and the carbon powder. The amount of the carbon powder based on 100 parts by mass of resin A in the composition is more preferably 11 to 30 parts by mass.

In the manufacture of a porous carbon electrode substrate by heating a composition containing short carbon fibers, resin A, and a carbon powder to carbonize resin A, the content of short carbon fibers and carbon powder in the composition is preferably 50 to 220 parts by mass in total based on 100 parts by mass of resin A in the composition. In this case, it is possible to maintain an appropriate amount of the carbonized resin A that bonds the short carbon fibers with the carbon powder, as well as suppress shrinkage and occurrence of cracks during carbonization of resin A so that the short carbon fibers are less likely to fall off the porous carbon electrode substrate and, thus, the short circuit current can be suppressed to a low level. Furthermore, it is possible to suppress the excessive increase in the bulk density of the porous carbon electrode substrate, and obtain a porous carbon electrode substrate having excellent gas permeability and power generation performance. Furthermore, the content of short carbon fibers and carbon powder can be an amount suitable for bonding the short carbon fibers with the carbon powder by the carbonized resin A. The total amount of the short carbon fibers and the carbon powder based on 100 parts by mass of resin A is more preferably 80 to 130 parts by mass.

The bulk density of the porous carbon electrode substrate is preferably 0.20 to 0.50 g/cm$^3$. The bulk density is calculated from the mass and thickness of a sample cut into a 10-cm square. For measurement of the thickness, a dial gauge having a head having a diameter of 5 mmφ is used, and the measuring pressure is set to 0.15 MPa. Controlling the bulk density of the porous carbon electrode substrate to 0.20 to 0.50 g/cm$^3$ makes it possible to suppress the falling of the short carbon fibers, suppress the short circuit current to a low level, and further set the gas permeability and power generation performance to excellent values. The bulk density is more preferably 0.25 to 0.40 g/cm$^3$, still more preferably 0.25 to 0.35 g/cm$^3$.

It is preferred that in three layers obtained by dividing, into a trisection, a section of the porous carbon electrode substrate from a surface having a 50% filling rate closest to that of the first surface to a surface having a 50% filling rate closest to that of a second surface in a direction perpendicular to a surface of the porous carbon electrode substrate (thickness direction of the porous carbon electrode substrate), a layer close to the first surface and a layer close to the second surface have different filling rates. The 50% filling rate is a value obtained by measuring the filling rates of surfaces of the porous carbon electrode substrate at every constant length from the first surface of the porous carbon electrode substrate to the second surface thereof, then obtaining the average value of the obtained filling rates of surfaces, and further calculating 50% of the obtained average value. Furthermore, the filling rate of a layer means an average value obtained by using the filling rates of surfaces that form the layer.

It is preferred that in three layers obtained by dividing, into a trisection, a section of the porous carbon electrode substrate from a surface having a 50% filling rate closest to that of the first surface to a surface having a 50% filling rate closest to that of a second surface in a direction perpendicular to a surface of the porous carbon electrode substrate, a layer X close to the first surface and having a largest filling rate, a layer Y close to the second surface and having a filling rate smaller than that of the layer X, and a layer Z present between the layer X and the layer Y have filling rates in descending order.

Furthermore, in a layer X close to the first surface and having a largest filling rate, and a layer Y close to the second surface and having a filling rate smaller than that of the layer X, it is more preferred that the filling rate of the layer X be 1.03 or more with the filling rate of the layer Y being 1. Selecting the surface on the side close to the layer X as surface A makes it possible to lower the short circuit current at surface A.

It is more preferred that the filling rate of the layer X be 1.03 or more, and the filling rate of the layer Z be 0.97 or less with the filling rate of the layer Y being 1. It is more preferred that the filling rate of the layer X be 1.05 or more, and the filling rate of the layer Z be 0.90 or less. Selecting the surface closer to the layer X as surface A makes it possible to lower the short circuit current at surface A, and obtain high power generation performance owing to the low filling rate of the layer Z.

The filling rates of the layer X, layer Y, and layer Z are obtained by three-dimensional measuring X-ray CT. Three-dimensional data of a carbon sheet are obtained by scanning the whole area of the carbon sheet in the direction perpendicular to the sheet surface at every constant length from the first surface of the carbon sheet to the second surface thereof by three-dimensional X-ray CT. By analyzing such three-dimensional data, it is possible to acquire the filling rate of the measured surface, and obtain the filling rate of a specific layer. The above-mentioned constant length (hereinafter referred to as "slice pitch") can be arbitrarily set, but it should be set to be one third or less of the average diameter of the short carbon fibers constituting the carbon sheet.

The surface filling rate at a predetermined position in the direction perpendicular to the surface of the carbon sheet is calculated by the following method. A slice image of the position in the three-dimensional data is divided into 256 stages from the maximum brightness to the minimum brightness using an image processing program "J-trim", and the image is binarized with a part at the 175th gradation stage from the minimum brightness taken as a threshold. Of the whole area, the percentage of the area of the brighter part in the binarized image is the surface filling rate at the predetermined position. The surface filling rate at the predetermined position is obtained at every constant length from the first surface of the carbon sheet to the second surface thereof, and the distribution of the surface filling rates in each constant length in the direction perpendicular to the surface is obtained. An average value is obtained using filling rate values of all the surfaces obtained in this manner, and a value of 50% (half) of the average value is taken as a 50% filling rate.

In each of three layers obtained by dividing, into a trisection, a section of the carbon sheet from a surface having a 50% filling rate closest to that of the first surface to a surface having a 50% filling rate closest to that of a second surface in a direction perpendicular to a surface of the carbon sheet, an average value is obtained using the filling rates of the surfaces forming the layer, and the average value is taken as the filling rate of the layer.

A layer close to the first surface and having a largest filling rate is referred to as a layer X, a layer close to the second surface and having a filling rate smaller than that of the layer X is referred to as a layer Y, and a layer present between the layer X and the layer Y is referred to as a layer Z.

Although the size of one measurement field of view for the calculation of the surface filling rate depends on the slice pitch, the filling rate is measured a plurality of times so that the total of the measurement fields would be 5 mm$^2$ or more, and the layer filling rate is determined from the average value of the measured filling rates.

The three-dimensional X-ray CT used in the measurement is SMX-160CTS manufactured by Shimadzu Corporation or a similar device. In the examples to be described later, since the average diameter of short carbon fibers was 7 μm, the surface filling rate was obtained with a slice pitch of 2.1 μm, a measurement field of view of 1070 μm, and a measurement field of view of 5 mm$^2$ or more. Thus, the filling rate was measured 7 times to obtain the filling rate of one surface.

The porous carbon electrode substrate in which the layer X, the layer Y, and the layer Z have filling rates in descending order, is obtained by a method of controlling the average diameter of the short carbon fibers constituting the porous carbon electrode substrate, the density of the porous carbon electrode substrate, and the distribution of resin A in the composite sheet before carbonization by heating in the direction perpendicular to the surface (thickness direction), and it is more preferred to control the distribution of resin A.

To control the distribution of resin A in the direction perpendicular to the surface, the porous carbon electrode substrate may be obtained in the following manner: as the above-mentioned composite sheet including the short carbon fiber sheet impregnated with resin A, three composite sheets having different impregnation amounts of resin A are prepared, these sheets are joined by lamination molding, and the laminate is carbonized; or a composite sheet having a distribution in the resin adhesion amount is prepared by using a method of imparting a resin by which the adhesion amount of resin A has a distribution in impregnating a porous body such as the short carbon fiber sheet with resin A, and the composite sheet is carbonized by molding without lamination. When the porous carbon electrode substrate is obtained by laminating composite sheets having different impregnation amounts of resin A, the filling rate tends to vary drastically at the lamination interface. Thus, the porous carbon electrode substrate is preferably prepared from a single composite sheet.

In addition, the method of preparing the porous carbon electrode substrate from a single composite sheet is also suitable for adjusting the thickness within a preferred range since the method makes it easy to obtain a porous carbon electrode substrate small in the thickness. A preferred range of the thickness is 50 μm to 200 μm, and the range is more preferably 90 μm to 150 μm. When the thickness is small, the porous carbon electrode substrate is fragile and difficult to handle. When the thickness is large, the porous carbon electrode substrate is low in hydrogen and oxygen permeability so that the output of the fuel cell is low.

A microporous layer can be provided on one surface of the porous carbon electrode substrate to form a gas diffusion layer of a fuel cell. The microporous layer is formed of carbon particles and a fluororesin, and is provided on a surface of the porous carbon electrode substrate. The carbon particles are not particularly limited, but are preferably carbon particles having at least a one-dimensional size of 1 μm or less among three-dimensional sizes (such particles are referred to as carbon fine particles) such as carbon black, "VGCF" (registered trademark) (manufactured by Showa Denko K.K.), and carbon nanotubes. The fluororesin is also not particularly limited, but fully fluorinated resins such as PTFE, FEP, and PFA are preferred.

The gas diffusion layer may have a microporous layer on either surface of the porous carbon electrode substrate, but preferably has a microporous layer on surface A of the porous carbon electrode substrate. Surface A is a smooth surface with few protrusions of short carbon fibers or the like. Thus, when a microporous layer is formed on surface A, the microporous layer of the obtained gas diffusion layer can also have few protrusions and, as a result, a fuel cell obtained by using such a gas diffusion layer hardly causes a short circuit.

Note that the microporous layer may partially infiltrate into the porous carbon electrode substrate. In the gas diffusion layer, a microporous layer is provided on surface A of the porous carbon electrode substrate, and the gas diffusion layer is incorporated into the fuel cell so that the microporous layer faces the polymer electrolyte membrane with the catalyst layer interposed therebetween. Thus, the gas diffusion layer can contribute to moisture retention, improvement in water removal properties, and prevention of a short circuit of the membrane.

The membrane-electrode assembly includes the porous carbon electrode substrate. That is, the membrane-electrode assembly for a fuel cell includes a polymer electrolyte membrane, catalyst layers on both surfaces of the polymer electrolyte membrane, microporous layers on outer surfaces of the catalyst layers (the surfaces of the catalyst layers different from the surfaces contacting the polymer electrolyte membrane), and porous carbon electrode substrates on outer surfaces of the microporous layers (the surfaces of the microporous layers different from the surfaces contacting the catalyst layers). It is possible to contribute to moisture retention, improvement in water removal properties, and prevention of a short circuit of the membrane in a fuel cell by providing the microporous layers on surfaces A of the porous carbon electrode substrates.

The open circuit voltage (OCV) of the polymer electrolyte fuel cell was measured by the following procedure.

(1) A catalyst liquid was prepared by sequentially adding 1.0 g of platinum-supported carbon (manufactured by Tanaka Kikinzoku Kogyo K.K., amount of platinum: 50 mass %), 1.0 g of purified water, 8.0 g of a "NAFION (registered trademark)" solution (5.0 mass % of "NAFION (registered trademark)" manufactured by Aldrich Chemical Co., Inc.) and 18.0 g of isopropyl alcohol (manufactured by Nacalai Tesque, Inc.).

Then, onto a "NAFLON (registered trademark)" PTFE tape "TOMBO (registered trademark)" No. 9001 (manufactured by Nichias Corporation), which had been cut into a size of 5 cm×5 cm, the obtained catalyst liquid was applied using a spray and dried at normal temperature to prepare a PTFE sheet with a catalyst layer having a platinum amount of 0.3 mg/cm². Subsequently, a solid polymer electrolyte membrane, "NAFION (registered trademark)" NR-211 (manufactured by DuPont), was cut into a size of 8 cm×8 cm and sandwiched between the two PTFE sheets each with a catalyst layer. The resultant was pressed at a temperature of 130° C. for 5 minutes using a flat press at a pressure of 5 MPa to transfer the catalyst layer onto the solid polymer electrolyte membrane. After pressing, the PTFE sheets were removed to prepare a solid polymer electrolyte membrane with a catalyst layer.

(2) The solid polymer electrolyte membrane with a catalyst layer was sandwiched between two gas diffusion layers each cut into a size of 5 cm×5 cm, and the resultant was pressed at a temperature of 130° C. for 5 minutes using a flat press at a pressure of 3 MPa to prepare a membrane-electrode assembly. The gas diffusion layer was disposed so that the surface having the microporous layer was in contact with the catalyst layer.

(3) The obtained membrane-electrode assembly and a separator were incorporated into a fuel cell evaluation unit cell. As a separator, a serpentine-type separator having one flow channel that is 1.0 mm in all of channel width, channel depth, and rib width was used. The cell temperature was set to 80° C., and unpressurized hydrogen was supplied to the anode and unpressurized air was supplied to the cathode. The hydrogen and air were both humidified using a humidification pot whose temperature was set to 40° C. The anode side separator and the cathode side separator were not electrically connected by an external circuit, and hydrogen and air were supplied for 2 hours in an open circuit state. After that, the potential difference (OCV) between the anode and the cathode was measured.

EXAMPLES

Example 1

A PAN-based carbon fiber "TORAYCA" (registered trademark) T300 (average diameter: 7 μm) manufactured by Toray Industries, Inc. was cut into an average short fiber length of 12 mm, dispersed in water, and continuously subjected to papermaking by a wet papermaking method. Furthermore, a 10 mass % aqueous solution of polyvinyl alcohol as a binder was applied to the paper and dried to prepare a short carbon fiber sheet having a short carbon fiber areal weight of 30 g/m². The adhesion amount of polyvinyl alcohol was 22 parts by mass based on 100 parts by mass of the carbon fibers.

Then, using a phenolic resin obtained by mixing a resol type phenolic resin with a novolac type phenolic resin so that the nonvolatile content would be 1:1 in mass ratio as a thermosetting resin, a scaly graphite powder (average particle diameter: 5 μm) as a carbon powder, and methanol as a solvent, the materials were mixed at a compounding ratio of thermosetting resin (nonvolatile content)/carbon powder/ solvent=10 parts by mass/5 parts by mass/85 parts by mass to give a uniformly dispersed resin composition (mixed liquid).

The phenolic resin obtained by mixing the resol type phenolic resin with the novolac type phenolic resin so that the nonvolatile content would be 1:1 in mass ratio had a residual carbon rate of 59%. Furthermore, in the composition, the amount of carbon powder was 50 parts by mass based on 100 parts by mass of resin A.

Then, the short carbon fiber sheet was immersed in the mixed liquid of the resin composition, sandwiched between rolls, and squeezed. In this process, two rolls were arranged horizontally with a certain clearance, and the short carbon fiber sheet was vertically pulled up to adjust the total adhesion amount of the resin composition. One of the two rolls was a smooth metal roll having a structure capable of removing an excessive resin composition with a doctor blade, and the other roll was a gravure roll having irregularities. The short carbon fiber sheet was sandwiched between the rolls with the metal roll placed on one surface of the sheet and the gravure roll placed on the other surface thereof and the sheet was squeezed to remove the impregnated liquid of the resin composition so that the adhesion amount of the resin composition differs between one surface and the other surface of the short carbon fiber sheet. Then, the short carbon fiber sheet was dried by heating at a temperature of 100° C. for 5 minutes to produce a composite sheet which is a short carbon fiber sheet containing a phenolic resin. The amount of the phenolic resin adhered to the composite sheet was 120 parts by mass based on 100 parts by mass of the short carbon fibers.

Then, the composite sheet was molded by heating at a temperature of 180° C. for 5 minutes while being pressurized with a flat press. At the time of pressurization, a spacer was placed on the flat press, and the distance between the upper and lower pressing plates was adjusted so that the thickness of the molded composite sheet would be 195 μm.

The substrate obtained by heat-treating the molded composite sheet was introduced into a heating furnace having a maximum temperature of 2400° C. kept in a nitrogen gas atmosphere to give a porous carbon electrode substrate. Two-stage heating was performed in a low temperature furnace having a maximum temperature of 750° C. and a high temperature furnace having a maximum temperature of 2400° C. In the heating, the average heating rate in the low temperature furnace was 2900° C./min, and the average heating rate in the high temperature furnace was 4200° C./min.

Kraft paper (areal weight: 70 g/m²) was disposed on both surfaces of the porous carbon electrode substrate, and calendering was performed at a linear pressure of 85 N/cm. To both surfaces of the calendered porous carbon electrode substrate, air was blown at 3.0 L/min/mm using a contactless dust removal cleaner Static Air type 08 manufactured by Dr. Escherich GmbH, and air was sucked from both the surfaces at 4.5 L/min/mm. One of the surfaces after suction (the surface contacted by the gravure roll during resin squeeze) was subjected to a treatment of removing protruded short carbon fibers by electric current burning. The electric current burning was carried out by a procedure described later.

The thickness of the porous carbon electrode substrate after the electric current burning was 143 μm, and the filling rate was different among the layers X, Z, and Y. The physical properties are shown in Table 1. The short circuit current was measured with the surface subjected to electric current burning as surface A. Surface A was on the side of the layer X having a higher filling rate.

Procedure of Electric Current Burning (1) A porous carbon electrode substrate was placed on an iron plate, and an end of the porous carbon electrode substrate was fixed with an adhesive tape. The porous carbon electrode substrate was placed with a surface in contact with the gravure roll during resin squeeze facing upward.

(2) A band-shaped film having a thickness of 30 μm was placed on the end of the porous carbon electrode substrate.

(3) The iron plate, a 12 V DC power supply, and a graphite square rod were connected in this order with a covered electric wire.

(4) The graphite square rod was placed on the band-shaped film and moved from one side of the porous carbon electrode substrate to the opposite side thereof.

By the procedure in the item (4), the graphite rod passes over the porous carbon electrode substrate with a gap of 30 μm therebetween, and a current flows through short carbon fibers protruding by 30 μm or more from the surface of the porous carbon electrode substrate to burn out the short carbon fibers.

Example 2

A porous carbon electrode substrate was obtained in the same manner as in Example 1 except that a large amount of the mixed liquid of the resin composition was removed from the whole. The physical properties are shown in Table 1.

For reference, in Example 2, the short circuit current was measured with the surface on the side subjected to electric current burning as surface A similarly to Example 1, and the value is shown in the table. The average short circuit current value measured at a surface different from the surface subjected to electric current burning was 12.0 mA, and the percentage of measurement points at which the short circuit current measured at a surface different from the surface subjected to electric current burning was 10 mA or less was 70%.

Example 3

A porous carbon electrode substrate was obtained in the same manner as in Example 1 except that a large amount of the mixed liquid of the resin composition was removed from the whole, and the drying at the time of preparation of the composite sheet was performed at a higher temperature. The purpose of performing the drying at a higher temperature is to suppress resin movement in the thickness direction during drying. The physical properties are shown in Table 1.

Example 4

A porous carbon electrode substrate was obtained in the same manner as in Example 3 except that a large amount of the mixed liquid of the resin composition was removed from surface Y, and the drying at the time of preparation of the composite sheet was performed at a higher temperature. The purpose of performing the drying at a higher temperature is to suppress resin movement in the thickness direction during drying. The physical properties are shown in Table 1.

Example 5

A porous carbon electrode substrate was obtained in the same manner as in Example 1 except that the average length of short carbon fibers to be subjected to papermaking was 6 mm, papermaking was performed by mixing 40 parts by mass of leaf bleached kraft pulp (LBKP) to 100 parts by mass of short carbon fibers, the areal weight of short carbon fibers at the time of papermaking was 14 g/m$^2$, the adhesion amount of polyvinyl alcohol was 33 parts by mass based on 100 parts by mass of short carbon fibers, the compounding ratio of thermosetting resin (nonvolatile content)/carbon powder/solvent=20 parts by mass/3 parts by mass/77 parts by mass, the two rolls for squeezing the impregnated resin liquid were smooth metal rolls, the composite sheet contained 110 parts by mass of the phenolic resin based on 100 parts by mass of short carbon fibers, two composite sheets were stacked so that the same surfaces thereof would face each other when the composite sheets were pressurized with a flat press, the distance between the upper and lower press plates was adjusted so that the thickness of the molded composite sheet (the two composite sheets adhered to each other into one sheet by molding) would be 165 μm, and the lower surface during the pressing was subjected to electric current burning. The physical properties are shown in Table 1.

When the short carbon fiber sheet was immersed in the mixed liquid of the resin composition, the amount of the carbon powder was 15 parts by mass based on 100 parts by mass of resin A in the mixed liquid (composition).

Comparative Examples 1 to 5

A porous carbon electrode substrate was obtained in the same manner as in Examples 1 to 5 except that the calendering and the treatment of removing the protruding fuzz by electric current burning were not carried out. The average short circuit current value was measured at both surfaces, and the value at the surface having the smaller average value is shown in the table. Specifically, as for Comparative Examples 1 to 4, the value at the surface on the side in contact with the gravure roll is shown, and as for Comparative Example 5, the value of the short circuit current measured at the lower surface during the pressing is shown.

The average short circuit current values of Examples 1 to 5 were remarkably low, and the percentages of measurement points at which the short circuit current was 10 mA or less thereof were remarkably high as compared to those of Comparative Examples 1 to 5 and those at the surface different from the surface subjected to electric current burning in Example 2. In particular, the average short circuit current values of Examples 1 to 4 were low, and the percentages of measurement points at which the short circuit current was 10 mA or less thereof were high. Even Examples 3 and 4 in which the density was particularly low showed average short circuit current values and percentages of measurement points at which the short circuit current was 10 mA or less comparable to those of Examples 1 and 2.

Example 6

A microporous layer was formed and a gas diffusion layer was prepared by the following procedure using the porous carbon electrode substrate of Example 5.

The porous carbon electrode substrate of Example 5 was immersed in an aqueous dispersion of a PTFE resin (water-repellent material) ("POLYFLON" (registered trademark) PTFE dispersion D-210C (manufactured by Daikin Industries, Ltd.)) to impregnate the porous carbon electrode substrate with the water-repellent material. Then, the resultant was heated and dried in a dryer furnace having a temperature of 100° C. for 5 minutes to give the porous carbon electrode substrate containing the water-repellent material. During drying, the porous carbon electrode substrate was vertically placed, and the vertical direction changed every minute. The aqueous dispersion of the water-repellent material was diluted to an appropriate concentration so that 5 parts by mass of the water-repellent material would be imparted to 95 parts by mass of the dried porous carbon electrode substrate.

Preparation of Gas Diffusion Layer
Materials
Carbon powder A: acetylene black: "DENKA BLACK" (registered trademark) (manufactured by Denki Kagaku Kogyo Co., Ltd.)
Material B: water-repellent material: aqueous dispersion of PTFE resin ("POLYFLON" (registered trademark) PTFE dispersion D-210C (manufactured by Daikin Industries, Ltd.))
Material C: surfactant "TRITON" (registered trademark) X-100 (manufactured by Nacalai Tesque, Inc.)

The above-mentioned materials and purified water were mixed using a dispersing machine to form a carbon powder-containing coating liquid. This carbon powder-containing coating liquid was applied in a planar form to one surface (the surface on the side subjected to electric current burning) of the porous carbon electrode substrate containing a water-repellent material (porous carbon electrode substrate of Example 5) using a slit die coater, and then heated at a temperature of 120° C. for 10 minutes and subsequently at 380° C. for 10 minutes. In this manner, a microporous layer was formed on the porous carbon electrode substrate containing the water-repellent material to prepare a gas diffusion layer. By providing a microporous layer on surface A side, the short circuit current can be reduced.

The physical properties are shown in Table 1. As for Example 6 in the table, the thickness and areal weight are values for the gas diffusion layer. Furthermore, the average short circuit current value and the percentage of measurement points at which the short circuit current was 10 mA or less are values measured at the surface of the gas diffusion layer having the microporous layer (that is, the surface of the microporous layer in the gas diffusion layer).

As the carbon powder-containing coating liquid used in this example, a mixture of carbon powder A:material B:material C:purified water=7.0:2.5:14:75.8 in mass ratio was used. The compounding amount of the material C (PTFE resin) is not the compounding amount of the aqueous dispersion of the PTFE resin but the compounding amount of the PTFE resin itself.

One polymer electrolyte membrane with a catalyst and two gas diffusion layers were stacked so that the catalyst layer and the microporous layer would face each other, and heated and pressurized at 3 MPa and 130° C. for 5 minutes with a flat press to form a membrane-electrode assembly for a fuel cell.

From Table 1, it is understood that in the porous carbon electrode substrate, the average short circuit current value measured at a first surface (referred to as surface A) was 10 mA or less and, in many cases, the percentage of measurement points at which the short circuit current was 10 mA was 90% or more. The porous carbon electrode substrate can prevent the short circuit inside the membrane-electrode assembly, and enhance durability of the fuel cell.

Furthermore, the OCV of five membrane-electrode assemblies was measured using the porous carbon electrode substrates for each of Examples 3 and 4 and Comparative Examples 3 and 4 and, as a result, it was 0.95 V or more in all of Examples 3 and 4. On the other hand, in each of Comparative Examples 3 and 4, one of the OCV values was below 0.94 V. The reason for the difference in the measured value between the examples and the comparative examples is considered as follows: the average short circuit current value of the porous carbon electrode substrate was made small in the examples, whereas in the comparative examples, since the average short circuit current value of the porous carbon electrode substrate was large, the membrane was locally thinned in many sites even inside the membrane-electrode assembly. In such a membrane-electrode assembly, performance deteriorates at an early stage due to the thinning and short circuit of the membrane caused by the repetition of starting and stopping of power generation. Moreover, in a fuel cell stack including a large number of the membrane-electrode assemblies connected in series, this effect is more prominent. In contrast, in a fuel cell including our porous carbon electrode substrate, the durability of power generation is improved.

TABLE 1

| | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Thickness [μm] | 143 | 143 | 142 | 142 | 145 | 172 | 150 | 150 | 150 | 150 | 153 |
| Areal weight [g/m$^2$] | 51 | 49 | 47 | 45 | 47 | 68 | 51 | 49 | 47 | 45 | 47 |
| Bulk density [g/cm$^3$] | 0.36 | 0.34 | 0.33 | 0.32 | 0.32 | — | 0.34 | 0.33 | 0.31 | 0.30 | 0.31 |
| Average short circuit current value [mA] | 0.0 | 0.0 | 0.0 | 0.9 | 4.9 | 1.0 | 12.0 | 14.2 | 16.8 | 17.7 | 21.1 |
| Percentage of measurement points at which short circuit current was 10 mA or less [%] | 100 | 100 | 100 | 95 | 90 | 100 | 70 | 70 | 60 | 60 | 50 |
| Filling rate of layer X [%] | 18.8 | 18.8 | 19.0 | 19.1 | — | — | 17.8 | 17.8 | 18 | 18.1 | — |
| Filling rate of layer Z [%] | 17.4 | 15.7 | 12.6 | 12.2 | — | — | 16.7 | 15.0 | 12.1 | 11.7 | — |
| Filling rate of layer Y [%] | 18.5 | 18.2 | 18.2 | 16.4 | — | — | 17.5 | 17.2 | 17.2 | 15.5 | — |
| Filling rate ratio of layer X | 1.014 | 1.033 | 1.042 | 1.164 | — | — | 1.017 | 1.035 | 1.047 | 1.168 | — |
| Filling rate ratio of layer Z | 0.938 | 0.861 | 0.693 | 0.744 | — | — | 0.954 | 0.872 | 0.703 | 0.755 | — |
| Filling rate ratio of layer Y | 1 | 1 | 1 | 1 | — | — | 1 | 1 | 1 | 1 | — |

The invention claimed is:

1. A porous carbon electrode substrate comprising short carbon fibers and carbonized resin bonding the short carbon fibers, the porous carbon electrode substrate having an average short circuit current value of 10 mA or less measured at a first surface A during a short circuit current test applying 1.0V of DC voltage,
wherein,
in three layers obtained by dividing into a trisection, a section of the porous carbon electrode substrate from a surface having a 50% filling rate closest to that of the first surface to a surface having a 50% filling rate closest to that of a second surface in a direction perpendicular to a surface of the porous carbon electrode substrate, a layer X close to the first surface and having a largest filling rate, a layer Y close to the second surface and having a filling rate smaller than that of the layer X, and a layer Z present between the layer X and the layer Y, and the three layers have filling rates in descending order of layer X, layer Y and layer Z.

2. The porous carbon electrode substrate according to claim 1, having a short circuit current of 10 mA or less at 90% or more of measurement points when the short circuit current is measured at surface A.

3. The porous carbon electrode substrate according to claim 1, having a bulk density of 0.20 to 0.50 g/cm$^3$.

4. The porous carbon electrode substrate according to claim 1, wherein the filling rate of the layer X is 1.03 or more and the filling rate of the layer Z is 0.97 or less with the filling rate of the layer Y being 1.

5. A method of manufacturing the porous carbon electrode substrate according to claim 1, comprising heating a composition containing short carbon fibers and a resin A having a residual carbon rate of 35% (mass basis) or more to carbonize resin A, calendering, carrying out air blowing or suction, then carrying out electric current burning, wherein, as for a mass ratio of the short carbon fibers to resin A in the composition, the composition contains 70 to 250 parts by mass of resin A based on 100 parts by mass of the short carbon fibers.

6. A method of manufacturing the porous carbon electrode substrate according to claim 1, comprising heating a composition containing short carbon fibers, a resin A having a residual carbon rate of 35% (mass basis) or more, and a carbon powder to carbonize resin A, calendering, carrying out air blowing or suction, then carrying out electric current burning, wherein, as for a mass ratio of resin A to the carbon powder in the composition, the composition contains 5 to 70 parts by mass of the carbon powder based on 100 parts by mass of resin A.

7. A gas diffusion layer comprising the porous carbon electrode substrate according to claim 1, and a microporous layer on one surface of the porous carbon electrode substrate.

8. A membrane-electrode assembly for a fuel cell, comprising the porous carbon electrode substrate according to claim 1.

9. The porous carbon electrode substrate according to claim 1, further comprising carbon powder.

10. A porous carbon electrode substrate comprising short carbon fibers and carbonized resin bonding the short carbon fibers, the porous carbon electrode substrate having an average short circuit current value of 10 mA or less measured at a first surface A during a short circuit current test applying 1.0V of DC voltage, wherein, in three layers obtained by dividing into a trisection, a section of the porous carbon electrode substrate from a surface having a 50% filling rate closest to that of the first surface A to a surface having a 50% filling rate closest to that of a second surface in a direction perpendicular to a surface of the porous carbon electrode substrate, a layer X close to the first surface A and having a largest filling rate, a layer Y close to the second surface and having a filling rate smaller than that of the layer X, and a layer Z present between the layer X and the layer Y, the three lasers have filling rates in descending order of layer X, layer Y and layer Z, and the filling rates are obtained by three-dimensional measuring X-ray CT.

* * * * *